United States Patent Office 3,704,282
Patented Nov. 28, 1972

3,704,282
CATECHOLAMINE ANTIGENS AND ANTIBODIES
SPECIFIC THEREFOR
Sidney Spector, 12 Troy Drive, Livingston, N.J. 07039
No Drawing. Continuation-in-part of application Ser. No. 826,268, May 20, 1969. This application Apr. 9, 1971, Ser. No. 132,823
Int. Cl. C08g 20/38; C08h 1/00
U.S. Cl. 260—78 A     6 Claims

ABSTRACT OF THE DISCLOSURE

Catecholamine antigens are prepared by coupling catecholamine haptens to immunogenic carrier materials. In preferred embodiments, proteins or polypeptides are used as carrier materials. These antigens produce immunological effects when injected into host animals, including the formation of anticatecholamine antibodies. These resulting antibodies are useful in bioanalytical techniques for the determination of catecholamine based activity in biological systems.

Related applications

The present application is a continuation-in-part of copending application Ser. No. 826,268, filed May 20, 1969, now abandoned.

Background of the invention

It has been known in the art for some time that various small molecules (haptens), which by themselves are wholly devoid of antigenicity, can modify the antigenic properties of a protein when the small molecule is combined with the protein through stable covalent linkages. In U.S. Pat. No. 2,372,066, patented Mar. 20, 1945, it is disclosed that antigens may be prepared by combining histamine or histamine-like compounds by linking the imidazole ring to a desired protein through a radical containing a group capable of coupling with protein. These antigens are used either by direct injection into a subject whereby resistance, refractoriness or active immunity is developed in said subject or for injecting into host animals from which antibodies specific to the hapten moiety, e.g., the histamine or histamine-like substance are developed.

A similar contemporary disclosure was made by Landsteiner in the "Specificity of Serological Reactions," Harvard University Press, Cambridge, Mass. (1945) wherein p-amino benzene arsonic acid was coupled to a protein via its diazonium salt to form a chemically simple, well-defined compound which was antigenic and stimulated the production of antibodies. Furthermore, the antibodies to this immunogen (conjugated protein) can combine with the small molecule, e.g., the arsonic acid which is unattached to any protein. This antibody is quite specific in activity. For example, if an isomer of arsonilic acid, in which the —AsO₃H group is in the meta position relative to the amino group, is utilized, it will not combine with the antibody formed against the protein-arsonilic acid complex in which the —AsO₃H group is para to the amino group.

The preparation of an "antigen" which purportedly elicited production of antibodies specific for the adrenalin group was described by Went et al. in Arch. für Exp. Path. und Pharm., 193 (1939), p. 609. This "antigen" was prepared by diazotizing aminoadrenalin and coupling the resulting diazoadrenalin at alkaline pH with a serum albumin. While it was demonstrated that this "antigen" elicited formation of antibodies specific for it, it was not shown, as in the above-described arsonic acid case, that these antibodies could combine with the hapten itself, i.e., the Adrenalin moiety. Indeed, it is almost a certainty that the sensitive catechol function of aminoadrenalin did not survive the alkaline coupling conditions. Thus, it appears that the "antigen" described by Went was not specific for adrenaline; most likely it contained an oxidized catechol function such as an orthoquinone.

In view of the known sensitivity and reactivity of catecholamines, particularly at alkaline pH and in the presence of oxygen (see, for example, pages 10–12, U.S. von Euler, "Noradrenaline," C. T. Thomas, Springfield, Ill., 1956) it is difficult to predict that: (a) a carrier could be combined with a catecholamine without destroying the catechol moiety; (b) such a material, if prepared, could survive intact in vivo for a sufficient length of time to reach the necessary sites and trigger antibody formation; and (c) such a material could act as an antigen so as to elicit formation of catecholamine specific antibodies. With regard to this last point, it should be mentioned that it is not yet possible, in the present state of the art, to predict or determine what properties are required to enable a molecule to act as an antigen. At one time, molecular weight and the possession of an aromatic group were thought to be the deciding factors. With time, the critical molecular weight required for antigenicity has been remarkably reduced. It is still believed, however, that molecular weight will, to some extent, determine the antigenic capabilities of a molecule. Other factors such as molecular shape and chemical reactivity must also play a role in the antigenic properties and thus render prediction of such properties exceedingly more difficult.

SUMMARY OF THE INVENTION
Summary of the Invention

The present invention relates to a novel class of antigens comprising a catecholamine hapten moiety coupled to an immunogenic carrier material. In preferred embodiments, the catecholamine is covalently bonded to a protein or polypeptide molecule by a peptide linkage. This peptide linkage involves the amino group of the catecholamine and a carboxy group in the protein or polypeptide chain. Additionally, the present invention relates to antibodies which will complex with some specificity with the catecholamine haptens. These antibodies are produced by treating host animals with the aforesaid antigen. Such specific antibodies are readily isolated from sera obtained from host animals after treatment of these host animals with the antigen.

The catecholamines useful as haptens in the practice of the present invention are a class of physiologically active aromatic amines. Examples of suitable catecholamines include, for example, norepinephrine, epinephrine and dopamine.

As used herein, the term "carrier material" is meant to include those materials which have the property of independently eliciting an immunogenic response in a host animal when injected therein and which can be coupled by covalent bonding to said catecholamine hapten. Suitable carrier materials include, for example, proteins; natural or synthetic polymeric compounds such as polypeptides, e.g., polylysine or polyglutamic acid; polysaccharides; and the like. Particularly preferred materials for the practice of the present invention are proteins and polypeptides.

The identity of the protein material utilized in the preparation of a preferred antigen of the present invention is not critical. Examples of preferred proteins useful in the practice of this invention include mammalian serum proteins such as, for example, human gamma globulin, human serum albumin, rabbit serum albumin, bovine gamma globulin and bovine serum albumin. Other suitable protein products will be suggested to one skilled in the art. It is generally preferred that proteins be utilized which are foreign to the animal hosts in which the resulting antigen will be employed.

The coupling of the catecholamine hapten with the protein to form the antigen of the present invention can be readily accomplished utilizing techniques now well known in protein chemistry for establishing peptide bonds. Thus, for example, one such technique would involve dissolving the protein and a dehydrating agent in a suitable inert solvent followed by adding a large molar excess of the desired catecholamine hapten. The reaction may be conducted at a temperature in the range of from about 0° C. to about 50° C., although higher or lower temperatures might be employed depending on the nature of the reactants and the denaturization temperature of the protein. A most preferable temperature is at about room temperature. It is desirable to utilize a slightly acidic reaction medium, e.g., a medium having a pH in the range of from about 3 to 6.5, most preferably in the range of from about 4 to 6.5. Upon completion of the reaction, the excess hapten molecules and dehydration agent may be removed by dialysis. The dialysis may be monitored by checking the dialysate for the presence of hapten or dehydrating agent or, alternatively, may be conducted for a pre-determined period of time, e.g., 3 days. Purified antigen is recovered as a residue in the dialysis bag.

Suitable solvents for use in the above reaction include, for example, the following: water, 0.15 M salts solution (NaCl), a 0.15 M salt soltuion buffered with 0.01 M phosphate buffer (pH 7.4) or a 0.01 M phosphate buffer solution. Solvents which denature proteins, e.g., organic solvents such as alcohols, ethers, etc. or strong inorganic acids or bases such as mineral acids or alkali hydroxides should generally not be employed.

The dehydrating agent which may be used in the aforesaid reaction will be selected from those commonly employed in peptide chemistry for initiating the formation of a peptide bond. A particularly suitable group of dehydrating agents comprise the carbodiimides, most preferably 1-ethyl-3-(3-dimehtylaminopropyl)-carbodiimide or dicyclohexylcarbodiimide. The amount of molar excess of the hapten over the protein in the aforesaid reaction will, of course, depend on the identity of the catecholamine hapten utilized and the protein selected for the reaction. Generally, a molar excess in the range of from about 100 to 1000, most preferably in the range from about 500 to 1000 of the hapten in relation to the protein, will be utilized.

When using a carbodiimide as the dehydrating agent, it is believed that the indicated reaction will proceed as per the following reaction scheme:

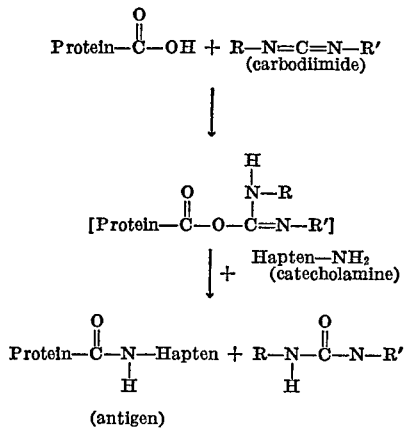

where R and R' are moieties comprising the remainder of the carbodiimide molecule.

The antigen can also be prepared from polypeptides having free carboxyl groups in the same manner as described above for proteins, using the carbodiimide dehydration technique. Another useful technique for preparing antigens from polypeptide carrier materials is to first react a protected catecholamine, e.g., homoveratrylamine, with a polyester of a polypeptitde containing side chain carboxyl groups, e.g., poly-γ-benzyl-L-glutamate, according to known procedures, to form the new polypeptide bond, and then to cleave the catecholamine protecting group to afford the desired catecholamine-polypeptide antigen. By employing this technique a high ratio of catecholamine to carrier material can be used. Thus, if poly-γ-benzyl-L-glutamate is utilized, one molecule of catecholamine can be introduced for each amino acid in the polypeptide chain, providing a large number of active sites to induce antibody formation. The number of active sites can be varied, if desired, by using a carrier material which is a copolymer of an amino acid containing a side chain carboxyl group with another amino acid not having a carboxyl side chain, e.g., a copolymer of glutamic acid and lysine. In such a copolymer, the ratio of, for example, the glutamic acid to the lysine, can be controlled as desired.

The antigen of the present invention may then be utilized to induce formation of catecholamine specific antibodies in the serum of host animals by injecting the antigen in such host repeatedly over a period of time, collecting the serum, precipitating the antibody with a neutral salt solution and purifying the antibody by dialysis and column chromatography. Suitable host animals for this purpose include mammals such as rabbits, horses, goats, guinea pigs, rats, cows, sheep, etc. The resulting antibody will have a multiplicity of active sites which will selectively complex with either a catecholamine or the catecholamine antigen described above.

The formation of catecholamine specific antibodies in the host animals may be monitored by taking blood samples from the host animals and adding to it an amount of the catecholamine-protein antigen. The presence of a precipitate indicates antibody activity. The antigen treatment of the animal can be continued until the antibody titer reaches the desired level of activity. For the purposes of this application the antibody titer is defined as being the maximum concentration of protein precipitated following the addition of varying known concentrations of antigen to fixed volumes of serum, e.g., 0.5 ml.

The catecholamine specific antibodies can be isolated from the sera of treated host animals by utilizing techniques well-known in the biochemical arts. For example, the sera obtained from treated host animals can be acted upon by a neutral salt which will effect precipitation of the desired catecholamine specific antibodies. Suitable neutral salts for this purpose include sodium sulfate, magnesium sulfate, a sodium hydrogen phosphate mixture or ammonium sulfate. The neutral salt preferred for the purpose of the present invention is ammonium sulfate. Purification techniques subsequent to the precipitation step may also be employed. For example, the obtained antibodies may be further purified by subjecting such antibody to dialysis and column chromatography. The resulting antibody may be characterized as being a gamma globulin having a molecular weight of about 160,000. This antibody will complex with catecholamine haptens and the catecholamine antigens described above.

The catecholamine specific antibodies of this invention are useful as reagents in biochemical assays for the determination of the presence of catecholamine based activity in specific biological systems. For example, if it should be desired to assay for catecholamine in a particular biological system, it would be possible to test this activity both before and then after treatment with a catecholamine specific antibody. The addition of the specific antibody would complex with the catecholamine and thus would effectively remove the catecholamine from the system and should result in an observed reduction in the specific activity under investigation. This reduction in activity will be proportional to the concentration of antibody added provided, however, that the catecholamine concentration can be made limiting, e.g., it should not be present in great excess.

Another assay procedure involves competitive inhibition which can be used to measure small amounts of catecholamine. In such a procedure a known amount of a labeled catecholamine is mixed with a catecholamine antibody and a sample containing the unknown quantity of catecholamine. The amount of catecholamine in the sample can be determined by measuring the amount of competitive inhibition observed in the binding of the labeled catecholamine with the catecholamine specific antibody caused by the catecholamine in the sample and then calculating the amount from a standard curve. Suitable labeled catecholamines for this purpose include isotopically labeled catecholamines as well as catecholamines labeled with an electron spin resonance group. Examples of the use of electron spin resonance labeled molecules are found in U.S. Pat. Nos. 3,453,288, 3,481,952 and 3,507,876. Such highly specific analytical tools for the assay of catecholamine based activities would be of great importance to biologists, physiologists, pharmacologists, biochemists, physicians, etc. as the catecholamines are involved in substantial numbers of important biological processes.

The novel antigens and antibodies of the present invention may be utilized in conjunction with conventional additives, buffers, stabilizers, diluents, or in combination with other physiologically active substances. The preparation and use of compositions containing antigens or antibodies in conjunction with physiologically acceptable adjuvants is now well known in the art.

This invention is further illustrated by the following specific examples.

EXAMPLE 1

Preparation of norepinephrine antigen

A total of 100 mgm. of bovine serum albumin was dissolved in 5 ml. of buffered saline solution comprising 0.01 M of phosphate buffer and 0.15 M of sodium chloride solution. The pH of this buffered saline solution was 7.4. To the buffered saline solution was added 200 mgm. of 1-ethyl-3-(3-dimethylaminopropyl)carbodiimide and the resulting solution was allowed to stand at room temperature for about 1 to 5 minutes. Then a total of 200 mgm. of norepinephrine was added slowly to it. The reaction mixture was then stirred overnight at room temperature. Dialysis of the reaction mixture for 3 days utilizing the buffered saline solution described above with repeated changes of this buffered saline solution yielded the desired norepinephrine-bovine serum albumin antigen as a residue in the dialysis bag. The antigen was found to contain 8 micromoles of norepinephrine per micromole of protein.

EXAMPLE 2

Preparation of norepinephrine specific antibody

A total of 1 mgm. of the antigen prepared in Example 1 was mixed with an equal volume of complete Freund's adjuvant. The mixture was stirred until a thick suspension formed. A total of 0.25 mgm. of this suspension was then injected into each of a host rabbit's foot paws. These injections were repeated each week for three weeks in each foot paw. On the fourth week, a total of 20 ml. of blood was taken from each rabbit by a cardiac puncture. The blood was permitted to coagulate and was then centrifuged to separate off the serum. The serum from the collective host rabbits was then pooled and the pooled serum treated with sufficient concentrated ammonium sulfate solution to yield a final ammonium sulfate concentration of about 40 percent in the resulting solution. The precipitate was collected by centrifuging and was then washed with 40 percent ammonium sulfate solution.

The resulting residue was dialyzed against the buffered saline solution described in Example 1 for a total of three days with repeated changes of the saline solution. The residue obtained from the dialysis bag was dissolved in the above-described buffered saline solution, which solution was then passed through a column of DEAE-Sephadex and the effluent collected. This effluent contained purified norepinephine specific antibody having a molecular weight of about 160,000.

EXAMPLE 3

Inhibition of norepinephrine lipolytic activity by norepinephrine specific antibody The lipolytic activity of norepinephrine on the isolated adipocytes from rat epididymal fat issue was utilized as an in vitro evaluation of the physiological effects of the antibody produced in Example 2. In the absence of any stimulatory agent the lipolytic activity of the isolated fat cells is very small and is not altered by the presence of the norepinephrine specific antibody as is shown by reference to Table I below. Norephinephrine at a concentration of $5 \times 10^{-7}$ M caused marked stimulation of lipolysis which was blocked 57.5 percent by 1.0 mg. per ml. of the norepinephrine specific antibody. The inhibition obtained was not the result of non-specific binding of norepinephrine to protein, for when norepinephrine was incubated in the presence of an immungluobuline directed against another hapten there was no inhibition of lipolysis by norepinephrine.

TABLE I

Effect of Anti-NE Antibodies on NE Induced Lipolysis In Isolated Fat Cells [1]

| Treatment | Rate of lipolysis, $\mu$eq. FFA/g. TG/hr.±S.E. | Percent inhibition |
| --- | --- | --- |
| None | 43.2±0.8 | |
| Anti-NE antibody (1 mg./ml.) | 39.2±0.8 | 0 |
| NE ($5 \times 10^{-7}$ M) | 269.2±10.3 | |
| NE plus anti-NE antibody (1 mg./ml.) | 114±10.5 | 57.5 |
| NE plus nonspecific antibody (1 mg./ml.) | 269±10.5 | 0 |
| NE plus nonspecific antibody (2 mg./ml.) | 269±10.5 | 0 |

[1] Fat cell suspended in Ringer solution were incubated for 1 hour at 37° in a Dubnoff metabolic shaker. Free fatty acid analysis was conducted on chloroform extract by the autoanalyzer procedure of Dalton and Kowalski, Clin. Chem., 13, 744–751 (1967) and the triglycerides analyzed by the fluorometric method of Kessler and Lederer, Automation In Analytical Chemistry, ed. L. F. Skaggs, Mediad Inc. (1966).

It is also possible to obtain graded inhibitory effects of the norepinephrine stimulation by modifying the concentration of the norepinephrine specific antibodies. This is shown graphically in Table II below.

TABLE II

| Percent inhibition of lipolysis: | Mg. protein/ml. |
| --- | --- |
| 16 | 0.30 |
| 18 | 0.75 |
| 58 | 1.50 |
| 67 | 1.80 |
| 70 | 2.80 |

EXAMPLE 4

Preparation of poly-γ-N-[2-(3,4-dimethoxyphenethyl)]-α-L-glutamamide hemihydrate A sample of poly-γ-benzyl-L-glutamate, MW 435,000 (330 mg., 1.5 mm.) was placed in a Pyrex tube and homoveratrylamine (2.71 g., 15 mm.) added. The tube was sealed and heated to 70° for 24 hours. The resultant gel was treated with an excess of ether, stirred, filtered and dried in vacuo. There was obtained white solid, poly-γ-N-[2-(3,4-dimethoxyphenethyl)]-α-L-glutamamide hemihydrate.

Analysis.—Calcd. for $C_{15}H_{20}N_2O_4 \cdot \tfrac{1}{2}H_2O$ (percent): C, 59.84; H, 7.03; N, 9.31. Found (percent): C, 59.47; H, 6.80; N, 9.28.

EXAMPLE 5

Preparation of poly-γ-N-[2-(3,4-dihydroxyphenethyl)]-α-L-glutamamide hydrate (dopamine-polyglutamate antigen)

Poly - γ-N-[2-(3,4-dimethoxyphenethyl)]-α-glutamamide hemihydrate (293 mg., 1.0 mm.) prepared as in Example 4 was placed in a round-bottomed flask. Methylene chloride (20 cc.) was added followed by the addition of borontribromide (2 g., 8.0 mm.). The reaction mixture was stirred oevrnight. Water (25 cc.) was added and stirred for 2 hours. The product was obtained by filtration. It was washed with methanol, water and ether and dried in vacuo. There was obtained 252 mg. of white solid, poly-γ-N-[2-(3,4-dihydroxyphenethyl)]-α-L-glutamamide hydrate.

Analysis.—Calcd. for $C_{13}H_{16}N_2O_4 \cdot H_2O$ (percent): C, 55.31; H, 6.43; N, 9.92. Found (percent): C, 55.90; H, 6.15; N, 9.94.

EXAMPLE 6

Preparation of poly-γ-N-[2-hydroxy-2-(3,4-dihydroxyphenyl)ethyl]-α-L-glutamamide hydrate (norepinephrine-polyglutamate antigen)

A sample of poly-γ-benzyl-L-glutamate, MW 435,000 (110 mg., 0.5 mm.) was placed in a Pyrex test tube and L-norepinephrine (846 mg., 5 mm.) and dimethylacetamide (1.5 cc.) added. The tube was sealed and heated to 110° for 3 days. The reaction mixture was added to an excess of 0.1 M HCl, filtered, washed with water and dried in vacuo. There was obtained 50 mg. of tan powder, poly-γ-N-[2-hydroxy-2-(3,4-dihydroxyphenyl)ethyl]-α-L-glutamamide hydrate.

Analysis.—Calcd. for $C_{13}H_{16}N_2O_5 \cdot H_2O$ (percent): C, 52.35; H, 6.08; N, 9.39. Found (percent): C, 52.34; H, 5.79; N, 8.58.

EXAMPLE 7

Preparation of norephrine specific antibody

Following the procedure of Example 2 utilizing the norepinephrine-polyglutamate antigen prepared in Example 6, norepinephrine specific antibody having a molecular weight of about 160,000 was produced.

EXAMPLE 8

Preparation of dopamine specific antibody

Following the procedure of Example 2, utilizing the dopamine-polyglutamate antigen prepared in Example 5, dopamine specific antibody having a molecular weight of about 160,000 was produced.

I claim:
1. An antigen consisting essentially of a catecholamine covalently bonded through a peptide linkage to a protein or polypeptide wherein said peptide linkage involves an amino group of said catecholamine and a carboxy group of said protein or polypeptide.
2. The antigen of claim 1 wherein said catecholamine is selected from the group consisting of epinephrine, norepinephrine and dopamine.
3. The antigen of claim 2 wherein said catecholamine is norepinephrine.
4. The antigen of claim 1 wherein said protein is bovine serum albumin.
5. The antigen of claim 4 wherein about 8μ mg. of catecholamine are bonded per μmg. of bovine serum albumin.
6. The antigen of claim 1 wherein said polypeptide is polyglutamic acid.

References Cited

UNITED STATES PATENTS 2,275,809   3/1942   Roberts ---------- 260—117 X

OTHER REFERENCES

Chem. Abstracts, vol. 67, 1967, 70820Z, Klimiman et al. and 17841F, Walaas et al.

Chem. Abstracts, vol. 70, 1969, 599X and 1,033,24H, Cohen et al.

Chem. Abstracts, vol. 64, 1966, 1217c, Roitrub.

Chem. Abstracts, vol. 17, 1969, 78769T, Livett et al.

Chem. Abstracts, vol. 52, 1958, 8313h–i, Antoniades et al.

Chem. Abstracts, vol. 72, 1970, 63318S, Lind et al.

Dissertation Abstracts, vol. XXIII, 1962, Litt., pp. 1936–7.

Science, vol. 144, 1964, pp. 1344–1346, Goodfriend et al.

HOWARD E. SCHAIN, Primary Examiner

U.S. Cl. X.R.

260—112 B, 112 R, 121; 424—78, 85, 88, 177